United States Patent
Peng et al.

(10) Patent No.: US 12,084,590 B2
(45) Date of Patent: Sep. 10, 2024

(54) WATER-BASED UV COATINGS, PREPARATION METHOD THEREFOR AND APPLICATION THEREOF

(71) Applicant: Zhejiang UVCHEM Special Coatings Co., Ltd, Zhejiang (CN)

(72) Inventors: Fuliang Peng, Zhejiang (CN); Tianyu Chen, Zhejiang (CN); Ligang Yu, Zhejiang (CN); Guanqun Fu, Zhejiang (CN)

(73) Assignee: ZHEJIANG UVCHEM SPECIAL COATINGS CO., LTD, Zhejiang (CN)

( * ) Notice: Subject to any disclaimer, the term of this patent is extended or adjusted under 35 U.S.C. 154(b) by 0 days.

(21) Appl. No.: 18/274,484

(22) PCT Filed: Dec. 14, 2021

(86) PCT No.: PCT/CN2021/137893
§ 371 (c)(1),
(2) Date: Jul. 27, 2023

(87) PCT Pub. No.: WO2022/160983
PCT Pub. Date: Aug. 4, 2022

(65) Prior Publication Data
US 2023/0416562 A1 Dec. 28, 2023

(30) Foreign Application Priority Data

Jan. 27, 2021 (CN) .......................... 202110112874.6
Sep. 14, 2021 (CN) .......................... 202111075879.2

(51) Int. Cl.
B05D 3/02 (2006.01)
C09D 7/40 (2018.01)
C09D 7/61 (2018.01)
C09D 175/14 (2006.01)

(52) U.S. Cl.
CPC ......... C09D 175/14 (2013.01); B05D 3/0254 (2013.01); C09D 7/61 (2018.01); C09D 7/67 (2018.01)

(58) Field of Classification Search
CPC .. C09D 169/00; C09D 175/14; C09D 175/16; C08L 69/00; C08L 75/14; C08L 75/16; C08L 175/14; C08L 175/16; B05D 3/065; B05D 3/067
See application file for complete search history.

(56) References Cited

U.S. PATENT DOCUMENTS

2010/0210757 A1* 8/2010 Sommer ............ C08G 18/4213
524/507

FOREIGN PATENT DOCUMENTS

| CN | 1990611 A | 7/2007 |
|---|---|---|
| CN | 101418147 A | 4/2009 |
| CN | 102827501 A | 12/2012 |
| CN | 102850899 A | 1/2013 |
| CN | 103333602 A | 10/2013 |
| CN | 104497847 A | 4/2015 |
| CN | 105419624 A | 3/2016 |
| CN | 105802483 A | 7/2016 |
| CN | 105859586 A | 8/2016 |
| CN | 110669427 A | 1/2020 |
| CN | 111440496 A | 7/2020 |
| CN | 113717631 A | 11/2021 |
| EP | 0618244 A2 | 10/1994 |
| JP | 2016222921 A * | 12/2016 |

OTHER PUBLICATIONS

Nejad et al. Advantages of Nano Pigment Over Micro Pigments in Obtaining Larger Spectra of Colours in CMYK System. Trans. Ind. Ceram. Soc., 70 (2) 93-99 (2011). (Year: 2011).*
Perkowitz, S. Paint it Nanoblack. 2016 Phys. World 29 (8) 48. (Year: 2016).*
Agnol et al. UV-curable waterborne polyurethane coatings: A state-of-the-art and recent advances review. Progress in Organic Coatings 154 (2021) 106156. (Year: 2021).*
WIPO, International Search Report issued on Feb. 17, 2022.
China Patent Office, First Office Action issued on Jan. 21, 2022 for CN application CN202111075879.2.
China Patent Office, Notification to grant issued on Jul. 5, 2022 for CN application CN202111075879.2.
Haibo Xu et al.:"Properties of waterborne polyurethane acrylate coating film by UV-heat dual curing", Journal of Nanjing Tech University (Natural science edition), Jan. 15, 2016.

* cited by examiner

*Primary Examiner* — William P Fletcher, III
(74) *Attorney, Agent, or Firm* — Li & Cai Intellectual Property (USA) Office

(57) ABSTRACT

A water-based dual-cure coating comprising the following raw material components: 15-25 parts by weight of a water-based polycarbonate dispersion, 30-60 parts by weight of a water-based aliphatic polyurethane acrylate dispersion, 5-15 parts by weight of a UV reactive diluent, 1-4 parts by weight of a photoinitiator, 0.2-1 part by weight of an auxiliary agent, 3-8 parts by weight of a film coalescing aid, and 5-15 parts by weight of water. The coating is sprayed onto an automotive interior part and subsequently cured by baking at a temperature of 50-65° C. to form a film, proceeding UV curing; and proceeding thermal curing at temperature of 70-80° C.

8 Claims, No Drawings

WATER-BASED UV COATINGS, PREPARATION METHOD THEREFOR AND APPLICATION THEREOF

CROSS REFERENCE TO RELATED APPLICATION

This is a National Phase Application filed under 35 U.S.C. 371 as a national stage of PCT/CN2021/137893, filed on Dec. 14, 2021, an application claiming the benefit of Chinese Application No. 202110112874.6, filed on Jan. 27, 2021, and Chinese Application No. 202111075879.2, filed on Sep. 14, 2021, the content of each of which is incorporated herein by reference in their entirety.

TECHNICAL FIELD

The present invention relates to the field of coating technology, particularly to water-based UV coatings for automotive interior parts, as well as its preparation method and application.

BACKGROUND

Ultraviolet (UV) curable coatings are a type of coatings that utilize UV initiators to trigger free-radical polymerization of liquid oligomers and monomers in the coating system, achieving crosslinking and curing to form a film. Compared to traditional curing coatings, UV-curable coatings offer advantages such as fast curing speed, excellent leveling and film-build, good chemical resistance, and outstanding scratch resistance. Therefore, they are widely used in automotive interior parts.

With the increasing awareness of environmental protection, countries around the world have been enacting laws and regulations to limit the emission of Volatile Organic Compounds (VOCs). As a result, there are higher environmental requirements for coatings used for automotive interior parts in the automotive industry. Water-based UV-curable coatings technology combines traditional UV curing technology with water-based coating technology, offering advantages such as low VOCs content, fast curing speed, and high efficiency. These coatings meet the requirements for green and eco-friendly solutions, thus gaining widespread attention and application in the industry. For example, prior art 1 (as described in CN110669427A), discloses a technology for automotive interior plastic parts, titled "Two-component water-based UV coating, preparation method and application thereof, and coating piece."

Regarding a coating film for automotive interior parts, wear resistance is a crucial performance characteristic. Currently, the VW TL226 standard is regarded as the most stringent standard in the automotive interior parts industry. This standard sets high requirements for the wear resistance of high gloss coating film. In particular, the PV3987 method is used wherein a high gloss coating film is scrubbed and the gloss reduction of the coating film after scrubbing should be 15%. Under this standard, in order to ensure a high yield of quality of automotive interior parts, the coating film's thickness is often set to be thick. However, a thicker coating film poses the risk of cracking.

Additionally, the penetration of ultraviolet (UV) light during the UV curing process is also influenced by the thickness of the coating film layer. If the coating film layer is too thick, the effectiveness of UV curing will be compromised.

On the other hand, the coverage area of UV curing is influenced by the geometry of the substrate. Automotive interior parts often have complex geometry, which can result in insufficient UV curing effectiveness.

In addition, in many cases, automotive interior plastic parts are dark in color, such as piano black. It is common in the industry to add water-based nano black pigment dispersion to the water-based UV coatings. After spraying and curing, the coating film can cover the color defects of the interior parts. However, in this case, the coatings is a pigmented coatings, and during the UV curing process, there is a significant difference in volume shrinkage between the upper layer and the lower layer (surface layer and deep layer) in the formed film, resulting in issues such as poor film-build and uneven color.

These factors limit the application of water-based UV-curable coatings in the automotive interior parts industry.

In summary, in the coating technical field for automotive interior parts, development of water-based UV-curable coatings with improved performance is required. These coatings need to strike a balance between high wear resistance and film thickness. They should ensure excellent wear resistance while avoiding issues such as coating film cracking and insufficient UV curing effect due to excessive thickness of the applied coatings.

SUMMARY

In order to solve the above problems in the prior arts, the present invention provides a water-based UV coatings that exhibits high wear resistance, reduced susceptibility to cracking, and improved curing effectiveness after application.

According to the water-based UV coatings of the present invention, the water-based UV coatings comprises the following raw material components, in parts by weight:

| | |
|---|---|
| water-based polycarbonate dispersion | 15-25; |
| water-based aliphatic polyurethane acrylate dispersion | 30-60; |
| UV reactive diluent | 5-15; |
| photoinitiator | 1-4; |
| auxiliary agent | 0.2-1; |
| film coalescing aid | 3-8; and |
| water | 5-15. |

In the coatings (base component) of the present invention, water-based aliphatic polyurethane acrylate dispersion is used as the main component. The presence of acrylic functional groups and urethane bonds in the polyurethane acrylate molecules provides high wear resistance after curing. The main role of water-based polycarbonate dispersion is improving the adhesion of water-based UV coatings on plastic parts; additionally, after curing, the coating film exhibits good toughness and is less prone to brittleness.

Preferably, the water-based polycarbonate dispersion has a functionality of 2 and a number average molecular weight ranging from 1000 to 5000. A higher number average molecular weight of the water-based polycarbonate dispersion results in better toughness of the coating film. However, the molecular weight should not be excessively high otherwise it will affect the leveling properties of the coatings.

Preferably, the water-based aliphatic polyurethane acrylate dispersion has a functionality of ≥6 and a number average molecular weight ranging from 800 to 3000.

The functionality refers to the number of unsaturated double bonds contained in the water-based polycarbonate dispersion or water-based aliphatic polyurethane acrylate dispersion. Functionality is one of the important factors that influence the curing speed of water-based UV coatings. A higher functionality leads to a faster curing speed. Increasing the functionality of the water-based aliphatic polyurethane acrylate dispersion, on one hand, can enhance the curing speed of the coating; on the other hand, it can improve the hardness and wear resistance of the coating film.

Preferably, the molar ratio of the water-based aliphatic polyurethane acrylate dispersion to the water-based polycarbonate dispersion is set to be 4:1 to 2:1.

Properly controlling the ratio of water-based polyurethane acrylate dispersion to water-based polycarbonate dispersion is to balance the wear resistance and crack resistance of the water-based UV coatings. If the content of water-based aliphatic polyurethane acrylate dispersion is too high, the coating film is prone to crack under thick application. On the other hand, if the content of water-based polycarbonate dispersion is too high, it can lead to deviations in the wear resistance of the coating film, failing to meet the wear resistance requirements in the automotive interior industry, such as wear resistance requirement for high gloss in the VW TL226.

Preferably, the UV reactive diluent is selected from one or more of the followings: 1,6-hexanediol diacrylate (HDDA), ethoxylated trimethylolpropane triacrylate (TMP3EOTA), propoxylated glycerol triacrylate (G3POTA), ethoxylated pentaerythritol tetraacrylate (PPTTA), and dipentaerythritol hexaacrylate (DPHA).

Preferably, the photoinitiators include surface curing photoinitiators and deep curing photoinitiators, with a molar ratio of the former one to the latter one in the range from 2:1 to 4:1;
- the surface curing photoinitiators can be selected from one or more of the followings: 1-hydroxycyclohexyl phenyl ketone, benzophenone, 1,1'-(methylene-di-4,1-phenylene)bis[2-hydroxy-2-methyl-1-propanone], 2-hydroxy-2-methyl-1-phenyl-1-propanone, and 2-hydroxy-2-methyl-1-[4-(2-hydroxyethoxy)phenyl]-1-propanone;
- the deep curing photoinitiators can be selected from one or more of the followings: 2,4,6-trimethyl benzoyl diphenyl phosphine oxide and bis(2,4,6-trimethyl benzoyl)phenyl phosphine oxide.

Preferably, the auxiliary agents comprise wetting agent and thickeners.

Preferably, the water-based UV coatings of the present invention, in parts by weight, further comprises the following raw material components:

| water-based nano black pigment dispersion, | 1-4 parts |
| water-based hydroxyl acrylic emulsion, | 10-20 parts. |

The coatings of the present invention comprises a component of water-based hydroxyl acrylic emulsion. This component contains a relevant more amount of free hydroxyl groups, which can further react with a thermal curing agent. This reaction enhances the toughness and wear resistance of the coating film, thereby reducing the risk of film cracking. Therefore, in the present invention, UV curing and thermal curing are combined to ensure effective curing while reducing film shrinkage and preventing coating film from cracking.

Preferably, the solid hydroxyl value of the water-based hydroxyl acrylic emulsion is in the range of 60 to 110 mg KOH/g.

As mentioned in the background section of the present written description, colored coatings often has issues such as uneven color of the coating film due to volume shrinkage of the formed film. However, the present coatings of the invention includes a water-based hydroxyl acrylic emulsion, which contains a significant amount of free hydroxyl groups. These hydroxyl groups can further react with a thermal curing agent, thus the reaction will increase the film's toughness and reduce its shrinkage rate, thereby mitigating the risk of film cracking.

Preferably, the particle size of the water-based nano black pigment dispersion is in the range of 50 to 300 nanometers.

Preferably, the film coalescing aid is selected from one or more of the followings: diacetone alcohol, dipropylene glycol methyl ether and propylene glycol methyl ether.

Preferably, a thermal curing agent can be further added into the water-based UV coatings of the present invention. The weight ratio of the water-based UV coatings to the thermal curing agent is in the range from 100:10 to 100:20.

The water-based UV coatings of the present invention can be cured through UV radiation. However, although the curing speed of UV is high, when the coatings is applied to substrates like automotive interior components with complex shape geometry, it is preferred to enhance the curing efficiency and effectiveness. Therefore, it is preferred to add a thermal curing agent to the water-based UV coatings of the present invention before the water-based UV coatings is sprayed onto the automotive interior parts. By combining UV curing with thermal curing, the curing effect can be ensured.

Preferably, the thermal curing agent is selected from one or more of the followings: isocyanates based on toluene diisocyanate (TDI), hexamethylene diisocyanate (HDI), isophorone diisocyanate (IPDI), and diphenylmethane diisocyanate (MDI), as well as carbodiimides and aziridines.

Preferably, the thermal curing agent is a hydrophilic aliphatic polyisocyanate based on hexamethylene diisocyanate (HDI), which exhibits good weather resistance, flexibility, adhesion, and chemical resistance. To balance the wear resistance and crack resistance of the water-based UV coatings, the NCO content in the thermal curing agent is controlled to be 16-22 wt %, as excessively low NCO content would affect the curing rate of thermal curing and reduce wear resistance, while excessively high NCO content would increase the crosslinking density of the system, leading to increased volume shrinkage of the film thus the risk of cracking would be increased.

The present invention also provides a method for preparing a water-based UV coatings, comprising the following steps:
- mixing water-based polycarbonate dispersion, water-based aliphatic polyurethane acrylate dispersion, UV reactive diluents, photoinitiators, auxiliary agents, film coalescing aid, and water thoroughly, to obtain the water-based UV coatings.

Preferably, the preparation materials of the water-based UV coatings also comprise water-based hydroxyl acrylic emulsion.

Preferably, the thermal curing agent is added to the water-based UV coatings, and the mixture is mixed thoroughly and then sprayed onto automotive interior parts for UV curing and thermal curing.

An application of the water-based UV coatings of the present invention in automotive interior parts, includes spraying the water-based UV coatings of the present invention onto the automotive interior parts and then curing them.

Preferably, the curing process includes the following steps in sequence:
  baking the coatings at temperature of 50-65° C. to form a film;
  proceeding UV curing; and
  proceeding thermal curing at temperature of 70-80° C.

Preferably, the conditions for UV curing are made with an energy of 600-1200 mJ/cm$^2$ and a light intensity of 80-300 mW/cm$^2$.

Preferably, the thickness of the sprayed coating film is controlled within the range of 25-55 μm.

When compared to the prior arts in the field, the present invention has at least one of the following technical effects:
1. The water-based UV coatings of the present invention achieve a balance between excellent wear resistance and crack resistance.
2. The water-based UV coatings of the present invention can be cured using a dual-curing process involving both light and heat, making them suitable for applying onto complex geometry automotive interior parts, with fast curing speed, high efficiency, and excellent results.
3. When the water-based UV coatings of the present invention is used for colored coatings such as piano black coatings, there is no occurrence of volume shrinkage in the coating film, thus there has no uneven color appearance issues caused by the volume shrinkage.

EMBODIMENTS

The following is a further description of the technical solution of the present invention, in conjunction with specific embodiments. However, it should be noted that the present invention is not limited to these embodiments.

Examples 1~6

Proceeding preparation according to the coating formulation provided in Table 1, the preparation process of coatings is proceeded as follows:

(1) Mix the UV reactive diluent, film coalescing aid and photoinitiator together. Disperse the mixture with 1000 rpm for 20 minutes until it is homogeneous. While maintaining the dispersing conditions, sequentially add the water-based polycarbonate dispersion, water-based aliphatic polyurethane acrylate dispersion, and waterborne hydroxyl acrylic emulsion. Disperse the mixture with 1000 rpm for 20 minutes. Then, sequentially add water, auxiliary agents, and water-based nano black pigment dispersion. Disperse the mixture with 1500 rpm for 60 minutes. Filter the mixture, discharge the material obtain by filtering, then obtaining the base component of water-based UV coatings.

(2) Mix the water-based UV coatings' base component obtained with thermal curing agent in a specific proportion until they are thoroughly blended. This will result in the water-based UV coatings.

TABLE 1

Coating formulations of Example 1~6 of the embodiments of the present invention, parts by weight

| Component | Example 1 | Example 2 | Example 3 | Example 4 | Example 5 | Example 6 |
|---|---|---|---|---|---|---|
| Water-based polycarbonate dispersion | 20 | 20 | 15 | 15 | 12 | 20 |
| Water-based aliphatic polyurethane acrylate dispersion | 40 | 40 | 45 | 45 | 48 | 40 |
| Water-based hydroxyl acrylic emulsion (TOD ® 2AH58W) | 10 | 10 | 10 | 15 | 15 | — |
| TMP3EOTA | 8 | 8 | 8 | 13 | 13 | 8 |
| DPHA | 5 | 5 | 5 | — | — | 5 (HDDA) |
| Photoinitiator 184 | 2 | 2 | 2 | 2 | 2 | 2 |
| Photoinitiator TPO | 0.5 | 0.5 | 0.5 | 0.5 | 0.5 | 0.5 |
| Wetting agent Tego 270 | 0.2 | 0.2 | 0.2 | 0.2 | 0.2 | 0.2 |
| Thickener Tego 3030 | 0.3 | 0.3 | 0.3 | 0.3 | 0.3 | 0.3 |
| Water-based nano black pigment dispersion | 2 | 2 | 2 | 2 | 2 | — |
| Diacetone alcohol | 5 | 5 | 5 | 5 | 5 | 5 |
| Water | 7 | 7 | 7 | 7 | 7 | 7 |
| Water-based isocyanate curing agent (Aquolin ® 268) | 15 | 10 | 15 | 15 | 15 | — |

Comparison Examples 1~5

Prepare coatings according to the coating formulations recited in Table 2, the preparation process is the same as that in Examples 1 to 5.

TABLE 2

Coating formulations of Comparison Examples 1~5, parts by weight

| Component | Comparison Example 1 | Comparison Example 2 | Comparison Example 3 | Comparison Example 4 | Comparison Example 5 |
|---|---|---|---|---|---|
| Water-based polycarbonate dispersion | — | 20 | 20 | 20 | 50 |
| Water-based aliphatic polyurethane acrylate dispersion | 60 | 40 | 40 | 40 | 10 |
| Water-based hydroxy acrylic emulsion (TOD ® 2AH58W) | — | — | 10 | 10 | 10 |
| TMP3EOTA | 8 | 8 | 8 | 8 | 8 |
| DPHA | 5 | 5 | 5 | 5 | 5 |
| Photoinitiator 184 | 2 | 2 | 2 | 2 | 2 |
| Photoinitiator TPO | 0.5 | 0.5 | 0.5 | 0.5 | 0.5 |
| Wetting agent Tego 270 | 0.2 | 0.2 | 0.2 | 0.2 | 0.2 |
| Thickener Tego 3030 | 0.3 | 0.3 | 0.3 | 0.3 | 0.3 |
| Water-based nano black pigment dispersion | 2 | 2 | 2 | 2 | 2 |
| Diacetone alcohol | 5 | 5 | 5 | 5 | 5 |
| Water | 7 | 7 | 7 | 7 | 7 |
| Water-based isocyanate curing agent (Aquolin ® 268) | — | — | — | 5 | — |

The coatings prepared in Examples 1 to 5 and Comparison Examples 1 to 5 were sprayed onto black ABS+PC substrates panels. After baking at temperature 60° C. for 15 minutes, UV curing was performed with UV energy of 1000 mJ/cm² and a light intensity of 80 mW/cm². Subsequently, the panels were baked at temperature of 80° C. for 120 minutes. The performance tests were conducted according to the testing standards specified in Table 3, with a film thickness of 30±5 μm for general performance testing panels and a film thickness of 55±5 μm for crack resistance testing panels.

The coatings prepared in Example 6 were sprayed onto transparent PC substrate panels. After baking at temperature 60° C. for 15 minutes, UV curing was performed with UV energy of 1000 mJ/cm² and a light intensity of 80 mW/cm². The performance tests were conducted according to the testing standards specified in Table 3, with a film thickness of 30±5 μm for general performance testing panels and a film thickness of 55±5 μm for crack resistance testing panels.

The test results are shown in Table 4, indicating that the coatings of the present invention exhibit a good balance between wear resistance and crack resistance, while also meets the testing requirements of the VW TL226.

TABLE 3

Performance Testing Standards and Requirements

| Tests | Test standard/method | Requirements |
|---|---|---|
| Wear resistance of high gloss surface | TL226-2018-04 PV3987 | ≤15% |
| Cracking resistance | Spray the coatings with film thickness of 55 ± 5 μm, bake it at 90° C. for 7 days after cutting "X", observe the cracking condition | no cracking |
| Adhesion | TL226-2020-10 D N E N ISO 2409 | ≤level 1 |
| Thermal aging under high temperature | TL226-2020-10 | no change in appearance, and adhesion ≤ level 1. |
| Condensation atmosphere with constant humidity | TL226-2020-10 D N E N ISO 6270-2 | no change in appearance and adhesion ≤ level 1. |
| Hydrolysis aging | TL226-2020-10 | no change in appearance and adhesion ≤ level 1. |
| Cream resistance | TL226-2020-04 PV3964 | no change in appearance, and adhesion is ≤ level 1. |

TABLE 4

Performance Test Results for Examples 1-6

| Tests | | Example 1 | Example 2 | Example 3 | Example 4 | Example 5 | Example 6 |
|---|---|---|---|---|---|---|---|
| Adhesion | | 0 level | 0 level | 0 level | 0 level | 0 level | 0 level |
| Wear resistance of high gloss surface | | 10% | 10% | 6% | 10% | 8% | 13% |
| Cracking resistance | | no cracking | no cracking | no cracking | no cracking | no cracking | no cracking |
| Thermal aging under high temperature | Appearance | no change | no change | no change | no change | no change | no change |
| | Adhesion | level 0 | level 0 | level 0 | level 0 | level 0 | level 0 |
| Condensation atmosphere with constant humidity | Appearance | no change | no change | no change | no change | no change | no change |
| | Adhesion | level 0 | level 0 | level 0 | level 0 | level 0 | level 0 |
| Resistance to hydrolysis aging | Appearance | no change | no change | no change | no change | no change | no change |
| | Adhesion | level 0 | level 0 | level 0 | level 0 | level 0 | level 0 |
| Cream resistance | Appearance | no change | no change | no change | no change | no change | no change |

TABLE 5

Performance Test Results for Comparison Examples 1-5

| Test | | Comparison Example 1 | Comparison Example 2 | Comparison Example 3 | Comparison Example 4 | Comparison Example 5 |
|---|---|---|---|---|---|---|
| Adhesion | | 1 level | 0 level | 0 level | 0 level | 0 level |
| Wear resistance of high gloss surface | | 6% | 7% | 8% | 9% | 30% |
| Cracking resistance | | serious cracking | serious cracking | serious cracking | serious cracking | no cracking |
| Thermal aging under high temperature | Appearance | no change | no change | no change | no change | no change |
| | Adhesion | level 2 | level 0 | level 0 | level 0 | level 0 |
| Condensation atmosphere with constant humidity | Appearance | no change | no change | no change | no change | no change |
| | Adhesion | level 3 | level 0 | level 0 | level 0 | level 0 |
| Resistance to hydrolysis aging | Appearance | blister | no change | no change | no change | no change |
| | Adhesion | level 5 | level 0 | level 0 | level 0 | level 0 |
| Cream resistance | Appearance | no change | no change | no change | no change | wrinkling |

Comparison Example 1: the coating formulation of the Comparison Example 1 does not comprise the water-based polycarbonate dispersion, and it was observed that after curing, the resistance to hydrolytic aging decreased, and the adhesion becomes poor.

Comparison Example 2: the coating formulation of the Comparison Example 2 does not comprise the water-based hydroxyl acrylic emulsion, and thermal curing agent was not used in this Comparison Example 2 for thermal curing, thus only UV curing was performed. After curing, it was observed that the coating film exhibited cracking issues.

Comparison Example 3: the coating formulation of the Comparison Example 3 does not comprise the water-based isocyanate curing agent for thermal curing, and it was observed that the coating film exhibited severe cracking issues after curing.

Comparison Example 4: the water-based isocyanate curing agent was added in an amount of 5 parts in weight, and it was observed that the coating film exhibited severe cracking issues after curing.

Comparison Example 5: the ratio of water-based polycarbonate dispersion to water-based aliphatic polyurethane acrylate dispersion is beyond the specified range of the technical solution of the present invention, with a higher content of water-based polycarbonate dispersion and without the addition of water-based isocyanate curing agent for thermal curing. After curing, it was observed that the coating film did not exhibit cracking (possessing flexibility). However, the wear resistance test's result of its high gloss surface was 30%, which exceeds the "15%" requirement range of the Volkswagen TL226 test.

The descriptions of the embodiments mentioned above are provided to facilitate the understanding and utilization of the invention by those skilled in the art. It is understood that one skilled in the art can make appropriate changes and modifications to the disclosed embodiments. Therefore, the present invention is not limited to the specific embodiments disclosed and described above, and any modifications and changes to the present invention are also covered by the protection scope of the claims of the present invention.

It should be noted that, the above embodiments are merely illustrative examples adopted to explain the principles of the present invention. However, the present invention is not limited thereto. One skilled in the art can make various modifications and improvements without departing from the spirit and essence of the present invention. Such modifications and improvements are also considered to be covered by the scope of protection of the present invention.

What is claimed is:

1. A water-based dual-cure coatings, comprising the following raw material components:
    15-25 parts by weight of water-based polycarbonate dispersion;
    30-60 parts by weight of water-based aliphatic polyurethane acrylate dispersion;
    5-15 parts by weight of UV reactive diluent;
    1-4 parts by weight of photoinitiator;
    0.2-1 part by weight of auxiliary agent;
    3-8 parts by weight of film coalescing aid;
    5-15 parts by weight of water;
    1-4 parts by weight of water-based nano-scale black pigment dispersion,
    10-20 parts by weight of water-based hydroxyl acrylic emulsion;
the functionality of the waterborne polycarbonate dispersion is 2 and a number-average molecular weight of the waterborne polycarbonate dispersion is ranging from 1000 to 5000;
the functionality of the water-based aliphatic polyurethane acrylate dispersion is ≥6, and a number average molecular weight of the water-based aliphatic polyurethane acrylate dispersion is ranging from 800 to 3000;
a thermal curing agent is added to the water-based UV coatings, and the weight ratio of the water-based UV coatings to the thermal curing agent is ranging from 100:10 to 100:20.

2. The water-based dual-cure coatings according to claim 1, wherein the molar ratio of the water-based aliphatic polyurethane acrylate dispersion to the water-based polycarbonate dispersion is 4:1 to 2:1.

3. The water-based dual-cure coatings according to claim 1, wherein the UV reactive diluent is selected from one or more of ethoxylated trimethylolpropane triacrylate, propoxylated glycerol triacrylate, ethoxylated pentaerythritol tetraacrylate, and dipentaerythritol hexaacrylate.

4. The water-based dual-cure coatings according to claim 1, wherein the photoinitiator comprises a surface curing photoinitiator and a deep curing photoinitiator, with a molar ratio of the former one to the latter one in the range from 2:1 to 4:1;
    the surface curing photoinitiator is selected from one or more of 1-hydroxycyclohexyl phenyl ketone, benzophenone, 1,1'-(methylene-di-4,1-phenylene)bis[2-hydroxy-2-methyl-1-propanone], 2-hydroxy-2-methyl-1-phenyl-1-propanone, and 2-hydroxy-2-methyl-1-[4-(2-hydroxyethoxy)phenyl]-1-propanone; and
    the deep curing photoinitiator is selected from one or more of 2,4,6-trimethylbenzoyl diphenyl phosphine oxide and bis(2,4,6-trimethyl benzoyl)phenyl phosphine oxide.

5. The water-based dual-cure coatings according to claim 1, wherein the water-based nano-scale black pigment dispersion has a particle size ranging from 50 to 300 nm.

6. The water-based dual-cure coatings according to claim 1, wherein the solid hydroxyl value of the water-based hydroxyl acrylic emulsion is ranging from 60 to 110 mg KOH/g.

7. A method for applying the water-based dual-cure coatings of claim 1 comprising: spraying the water-based dual-cure coating onto an automotive interior parts and subsequently curing the coating.

8. The method according to claim 7, wherein curing the coating comprises the following steps in sequence:
    baking the coating at a temperature of 50-65° C. to form a film;
    UV curing the film; and
    thermal curing the film at a temperature of 70-80° C.

* * * * *